United States Patent [19]

Futamoto et al.

[11] Patent Number: 4,840,844
[45] Date of Patent: Jun. 20, 1989

[54] MAGNETIC RECORDING MEDIUM

[75] Inventors: Masaaki Futamoto, Kanagawa; Yukio Honda, Fuchu; Shinichiro Saito, Tokyo; Takashi Nishimura, Kokubunji; Kazuetsu Yoshida, Kodaira; Toyoji Okuwaki, Tokyo; Hitoshi Iwata, Kumagaya; Hiroyuki Suzuki, Kokubunji; Kazushige Imagawa, Koganei; Hideo Daimon; Osamu Kitakami, both of Toride; Hideo Fujiwara, Ibaraki, all of Japan

[73] Assignees: Hitachi, Ltd.; Hitachi Maxell Ltd., both of Tokyo, Japan

[21] Appl. No.: 56,661

[22] Filed: Jun. 2, 1987

[30] Foreign Application Priority Data

Jun. 2, 1986 [JP] Japan .................. 61-125777
Mar. 30, 1987 [JP] Japan .................. 62-77857

[51] Int. Cl.$^4$ .................................... G11B 5/64
[52] U.S. Cl. .................. 428/336; 427/131; 427/132; 428/408; 428/457; 428/694; 428/900
[58] Field of Search ........... 427/131, 132; 428/695, 428/694, 336, 457, 408

[56] References Cited

U.S. PATENT DOCUMENTS

| Re. 32,464 | 7/1987 | Aine | 427/38 |
| 4,411,963 | 10/1983 | Aine | 427/132 |
| 4,503,125 | 3/1985 | Nelson | 427/131 |
| 4,647,494 | 3/1987 | Meyerson | 427/131 |
| 4,664,976 | 5/1987 | Kimura | 427/131 |

FOREIGN PATENT DOCUMENTS 258727 12/1985 Japan ................... 428/328
110331 5/1986 Japan .

Primary Examiner—Paul J. Thibodeau
Attorney, Agent, or Firm—Antonelli, Terry & Wands

[57] ABSTRACT

A magnetic recording medium which comprises a nonmagnetic substrate, a magnetic film formed on the substrate and a protective film provided on the magnetic film, the protective film being composed of at least two groups of element, the element in one group being at least one of B and C having a smaller atomic size, and a concentration of the element increasing from the interface side of the protective film with the magnetic film toward the opposite face side throughout the protective film has an improved durability against a magnetic head.

18 Claims, 2 Drawing Sheets

MAGNETIC RECORDING MEDIUM

BACKGROUND OF THE INVENTION

This invention relates to an improvement of a magnetic recording medium, and particularly to a magnetic recording medium with an improved durability against a magnetic head.

Research and development of continuous magnetic films for use as a continuous magnetic recording medium have been made for a higher density magnetic recording.

Magnetic recording media are prepared by forming a thin film of an alloy or a compound containing a ferromagnetic metal such as Fe, Co, Ni, etc. on a substrate of non-magnetic material such as a polymer film, aluminum, glass, etc. by vacuum evaporation, sputtering, plating, etc. Magnetic recording media have such problems that the surface of a magnetic film will wear when used in direct contact with a magnetic head for recording and reproduction, the magnetic head will be damaged through contact with the magnetic film, and the magnetic film will be deteriorated by corrosion, etc. through contact with a humid atmosphere.

To solve these problems, it has been proposed to form a protective layer composed of a hard material such as $SiO_2$, $Al_2O_3$, $Cr_2O_3$, SiC, TiC, etc. on the surface of a magnetic film [Japanese Patent Application Kokai (Laid-Open) Nos. 50-104602 and 58-130437], or to form a metal film of Au, Pt, Rh, Pd, Al, etc. as a protective layer on the surface of a magnetic film [Japanese Patent Application Kokai (Laid-open) Nos. 53-40505 and 57-176537]. However, the present inventors have found that the metallic protective film has no sufficient durability against the sliding with a magnetic head or no sufficient resistance against corrosion, whereas the protective film composed of the compound-based hard material has a low impact resistance and a high liability to damage the magnetic head.

The requirements for a protective film are a thorough chemical and mechanical protection of a magnetic film and a less liability to damage the magnetic head. The prior art protective film has paid no thorough considerations to these requirements, and still has such problems as an insufficient protective action on the magnetic film and a high liability to damage the magnetic head.

SUMMARY OF THE INVENTION

An object of the present invention is to provide a magnetic recording medium having a protective film that can give a sufficient protective action on a magnetic film and has a less liability to damage a magnetic head at the same time.

This and other objects of the present invention can be attained by a magnetic recording medium which comprises a non-magnetic substrate, a magnetic film formed on the substrate and a protective film provided on the magnetic film, the protective film containing at least one element selected from the group consisting of B and C as a constituent element, and the concentration of the selected element being changed throughout the protective layer from the interface side with the magnetic film toward the opposite face side.

DETAILED DESCRIPTION OF PREFERRED EMBODIMENTS

Figure 1:
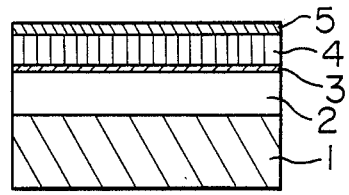
FIG. 1 is a partial cross-sectional view of a magnetic recording medium according to one embodiment of the present invention.

A magnetic film is generally composed of an alloy or a compound containing Fe, Co, Ni, etc. as the main component. A protective film to be formed thereon must have an increased affinity toward such a magnetic film and conquently an increased adhesive force, and also must develop no strain in the magnetic film at the same time. To this end, a protective film containing an element having an atomic size substantially equal or larger than that of the constituent element of a magnetic film may generally satisfy these requirements.

On the other hand, in order to give a magnetic film a thorough resistance against corrosion and a thorough resistance against wearing or to give a magnetic head a slidability, a protective film must have a high compactness and a high strength. The high compactness and high strength of the protective film are particularly required for the region on the interface side of the protective film with a magnetic head, that is, on the side to be exposed to the surrounding atmosphere. These properties can be obtained with elements of small atomic size, or their compounds or their mixed materials. These elements include C, B, etc. The atomic radii of these elements are less than 1Å, which is about 50 to about 80% of the atomic radii, i.e. 1.1 to 1.3Å, of Fe, Co and Ni, main constituent elements of the magnetic film.

When a protective film composed of two kinds of element species, for example, one element species A having a larger atomic size and another element species B having a smaller atomic size, is provided on a magnetic film, the said requirements can be satisfied by increasing the concentration of tee element species A having a larger atomic size toward the interface side of the protective film with the magnetic film while decreasing the concentration of the element species A and increasing the concentration of the element species B with increasing distance from the interface side with the magnetic film throughout the protective film. In the case of a protective film composed of three or more kinds of element species, the said requirements can be satisfied by continuously increasing the atomic density per unit volume of the protective film from the interface side of the protective film with the magnetic film toward the face side of the protective film throughout the protective film.

Heretofore, such carbides as TiC, ZrC, HfC, VC, NbC, WC, TaC, SiC, etc. have been used as materials for the protective film, but have such problems as a low impact resistance and a high liability to damage the magnetic head, as mentioned before. In the case of using such metal carbides in a protective film, the said requirements can be also satisfied by distributig the constituent elements with given concentration gradients throughout the protective film so that the concentration of metal can be higher toward the interface side of the protective film with the magnetic film and the concentration of C can be higher in the reverse direction, i.e. toward the face side of the protective film.

In the case of a protective film composed of C, B and other elements, the concentration of C or B, or the concentration in total of C and B must be increased from the interface side of the protective film with the magnetic film toward the face side throughout the protective film.

Even in a protective film composed only of elements of smaller atomic sizes, it has been found that boron (B) is an element having a good adhesion to a magnetic film composed of an alloy or a compound composed of Fe, Co, Ni, etc. as the main components, and being less capable of developing a strain in the magnetic film at the same time. Thus, when a protective film is composed substantially of two kinds of constituent element, boron (B) and carbon (C), the concentration of C must be increased from the interface side of the protective film with the magnetic film toward the face side of the protective film throughout the protective film.

Besides giving such concentration gradients of elements throughout the protective film of a single layer structure, it is possible to prepare a protective film of a multi-layer structure by making layers nearer to the face side of the protective film have a higher concentration of C or B. Needless to say, total of B and C may have such a relationship of changing concentrations as given above.

The protective film is desirably in an amorphous state, because the film composition can be readily changed in the film thickness direction in a continuous manner, but may be in a mixed state of amorphous and crystalline states. The thickness of the protective film is 50 to 2,000Å, preferably 100 to 300Å. Furthermore, it is desirable that the atomic density has a difference at least by 5% between the interface side with a magnetic film and the face side of the protective film.

The present protective film can be formed by vapor deposition including vacuum evaporation and sputtering, or by chemical vapor deposition including plasma polymerization, or by ion bombardment of elements C, B, etc. The remarkable effects of the present invention can be obtained by distributing the said elements with given concentration gradients throughout the protective film in any of the foregoing deposition procedures.

When there is a gas containing H, O or N in the atmosphere for forming a protective film during the protective film deposition, these elements H, O or N may be contained in the protective film. The present invention covers protective films containing these elements.

Other elements for use in combination with B and C include, for example, said Ti, Zr, Hf, V, Nb, W, Ta, Si, etc, among which Si is preferable, because it has a good adhesion to a magnetic film composed of an alloy or a compound composed of Fe, Co, Ni, etc. as the main component and is less liable to develop a strain in the magnetic film at the same time.

Another aspect of the present invention is to provide a magnetic recording medium having such a protective film that the protective film is a multi-layer film prepared by alternately laying carbon films and metal films one upon another, where the outermost layer on the interface side with the magnetic film is the metal layer, whereas the outermost layer on the opposite face side is the carbon layer. In that case, it is preferable to select an element capable of forming a carbide such as Si, Zr, W, V, B, Cr, Ti, Ta, etc. as the metal elements for the metal layer. The thickness of the carbon layer is preferably 0.5 to 10 nm, whereas that of the metal layer is preferably 0.5 to 30 nm.

By heating the multi-layer film in vacuum after the formation of the film, interfusion is promoted between the carbon layers and the metal layers to form a carbide. Particularly when the individual layers have a thickness of 0.5 to 2 nm, the interfusion of the elements can be uniformly carried out.

EXAMPLE 1

A magnetic recording medium as shown in FIG. 1 was prepared according to a continuous sputtering method, using a polyimide film as a substrate. That is, after a sputtering chamber was evacuated to $10^{-6}$ Torr or less, an Ar gas under $10^{-3}$ Torr was introduced into the sputtering chamber, and the film substrate was coated with Permalloy to a thickness of 0.5 μm, then with Si to a thickness of 0.02 μm, and then with 80 wt. % Co—20 wt. % Cr to a thickness of 0.2 μm by sputtering at a film substrate temperature of 120° C. Then, the coated substrate was transferred into a protective film-forming chamber by a transfer mechanism and coated with a protective film of $Si_xC_{1-x}$ to a thickness of 200Å according to a simultaneous sputtering method, using two targets, i.e. Si target and C target. The atomic sizes of Si and C were 1.04Å and 0.77Å, respectively. That is, C had a smaller atomic size. By controlling the sputtering power to the two targets, the value x in the formula was changed in the film thickness direction. That is, x in the protective film composition was changed from the initial stage ($x_1$) of film formation toward the final stage ($x_2$) of film formation. Five kinds of test pieces were prepared under the same conditions for forming a magnetic film as above except for those for forming a protective film by changing a difference in changes of x between the initial and final stages, i.e. $\Delta x(=x_2-x_1)$.

Disks were blanked out from the test pieces, coated with a liquid lubricant to a thickness of 150Å, mounted on a disk-driving means, and subjected to sliding tests with a magnetic head made from Mn—Zn ferrite coated with a CoNbZn alloy film as a magnetic material.

Figure 2:
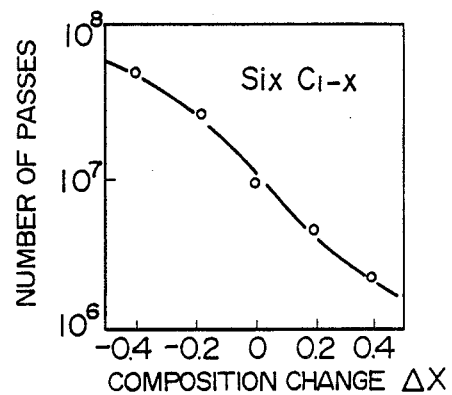
FIGS. 2 to 4 are diagrams and a view illustrating the present invention.

Number of revolutions (passes) was measured under a magnetic head load of 15 g and at a turning speed of the disk of 2 m/sec, relative to the magnetic head, until the recording-reproduction power was lowered down to 70 % of the initial power. FIG. 2 shows a relationship between the difference in changes of x, i.e. composition change ($\Delta x$), in the film thickness direction of $Si_xC_{1-x}$ and the number of revolutions (passes). It can be seen from FIG. 2 that the disks having a higher concentration of C in the film thickness direction from the interface side with the magnetic film towards the face side have a distingushed resistance against the sliding.

EXAMPLE 2

Magnetic recording media were prepared in the same manner as in Example 1, except that a protective film material of $M_xC_{1-x}$ was used, where M was Ti, Zr, Hf, V, Nb, W or Ta. It was found that the resistance of the protective films containing any of these metal elements against the sliding was increased with increasing concentration of C having the smaller atomic size in the film thickness direction from the interface side with the magnetic film toward the face side.

EXAMPLE 3

Aluminum alloy disks having an aluminum oxide film on the surfaces were used as a substrate. After coating with Cr to a thickness of 0.3 μm, and then with a Co—Ni alloy to a thickness of 0.1 μm in the same manner as in Example 1, a protective film having a thickness of 200Å was formed from two targets, i.e. $Al_2O_3$ target and $B_4C$ target, onto the substrate according to a simultaneous sputtering method. The composition of the protective film was changed by changing the power to the $B_4C$ target as the thickness of the protective film increased. $B_4C$ had a higher atomic density per unit volume than that of $Al_2O_3$.

Figure 3:
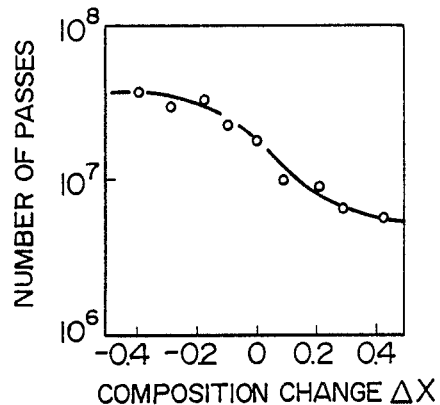

When the composition of the protective film is represented by $xAl_2O_3+(1-x)B_4C$, the value x at the initial stage of film formation by $x_1$, and that at the final stage of film formation by $x_2$, a relationship between $\Delta x=x_2-x_1$ and the resistance against the sliding as determined is shown in FIG. 3. The resistance against the sliding is shown in terms of the number of revolutions (passes) as in Example 1, and the composition of the protective film was determined by both Auger electron spectroscopy and ion micro-probe analyzer. It can be seen from FIG. 3 that the resistance against the sliding is increased with increasing concentrations of B and C, that is, increasing concentrations of elements having smaller atomic sizes on average as the thickness of the protective film increases.

EXAMPLE 4

Figure 4:
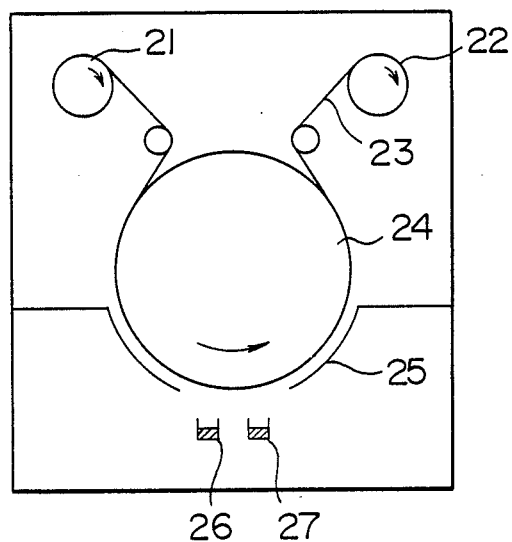

Magnetic recording media according to the present invention were prepared in a vacuum chamber shown in FIG. 4. In the vacuum chamber, an aramid film 23 coated with a $Co_{81}Cr_{19}$ film to a thickness of 0.2 μm from a roll 21 was subjected to a protective film formation along a can roll 24 heated at 150° C. and wound up onto a roll 22. The vacuum chamber was provided with two evaporation sources 26 and 27 under the can roll 24 through an opening of a shield 25. In the evaporation sources 26 and 27, B-C based metals of varied compositions were placed. The protective films thus formed had a thickness of 200Å. The compositions of the thus formed B-C based protective films were analyzed by Auger electron spectroscopy. The adhesion of the protective films to the magnetic films was measured by a tensile tester, where the test pieces undergoing no peeling at the interface between the magnetic film and the protective film were determined as "acceptable".

Furthermore, the protective film-coated aramid films thus obtained were blanked out into disks, 3.5 inch in diameter, and subjected to a durability test under such conditions as a peripheral speed of 2 m/sec and a magnetic head-pressing load of 18 g. The disks capable of maintaining at least 80% of the initial recording-reproducing power after 3,000,000 passes of the magnetic head were determined as "acceptable".

Resistance against corrosion was determined by leaving the test pieces at 60° C. and 90% relative humidity (RH) for 4 weeks, and those showing no abnormal surface state at all were determined as "acceptable". Results are summarized in the following Table.

TABLE 1

| Test piece No. | C content A | C content B | Adhesion | Durability (after 3,000,000 passes) | Corrosion resistance (after 4 weeks) |
|---|---|---|---|---|---|
| 1 | 19 | 0 | o | o | x |
| 2 | 18 | 9 | o | o | x |
| 3 | 18 | 20 | o | o | x |
| 4 | 20 | 33 | o | o | o |
| 5 | 19 | 56 | o | o | o |
| 6 | 20 | 90 | o | o | o |
| 7 | 100 | 100 | x | x | o |

Remarks:
C content: C/(C + B) × 100 (wt. %)
A: region near the interface side with the magnetic film
B: outermost region at the face side of the protective film
o: acceptable
x: unacceptable As is obvious from Table 1, test pieces having a higher C content in the outermost region at the face side of the protective film than in the region near the interface side with the magnetic film are more distinguished in all of the adhesion, durability and corrosion resistance.

EXAMPLE 5

Magnetic recording media according to the present invention were prepared in a vacuum chamber as shown in FIG. 4.

In the vacuum chamber, a polyimide film 23 coated with a $Co_{82}Cr_{18}$ film to a thickness of 0.12 μm from a roll 21 was subjected to a protective film formation along a can roll 24 heated at 200° C., and wound up onto a roll 22. The vacuum chamber was provided with two evaporation sources 26 and 27 under the can roll 22 through an opening of a shield 25. In the evaporation sources 26 and 27, Si—B—C based metals of varied compositions were placed. The protective films thus formed had a thickness of 200Å.

The elemental ratios of the Si—B—C protective films thus formed were analyzed by Auger electron spectroscopy.

The adhesion of the protective films to the magnetic films was measured by a tensile tester, where the test pieces undergoing no peeling at the interface between the magnetic film and the protective film were determined as "acceptable".

Furthermore, the protective film-coated films cut out into magnetic tapes and the cut-out magnetic tapes were subjected to a still test, where those having a still life of more than 60 minutes were determined as "acceptable".

Resistance against corrosion was determined by leaving the test pieces at 60° C. and 90% relative humidty (RH) for 4 weeks, and those showing no abnormal surface state at all were determined as "acceptable".

The results are summarized in the following Table 2.

TABLE 2

| Test piece No. | Elemental ratio A | Elemental ratio B | Adhesion | Still strength | Corrosion resistance (after 4 weeks) |
|---|---|---|---|---|---|
| 1 | 0.32 | 0.12 | o | o | x |
| 2 | 0.31 | 0.29 | o | o | x |
| 3 | 0.31 | 0.36 | o | o | o |
| 4 | 0.33 | 0.58 | o | o | o |
| 5 | 0.32 | 0.83 | o | o | o |

TABLE 2-continued

| Test piece No. | Elemental ratio A | Elemental ratio B | Adhesion | Still strength | Corrosion resistance (after 4 weeks) |
|---|---|---|---|---|---|
| 6 | 0 | 0 | o | o | x |

Remarks:
Elemental ratio: (B + C)/(Si + B + C)
A: region near the interface side with the magnetic film
B: outermost region at the face side of the protective film
o: acceptable
x: unacceptable As is obvious from Table 2, test pieces having a higher elemental ratio in the outermost region at the face side of the protective film than in the region near the interface side with the magnetic film are more distinguished in all of the adhesion, durability and corrosion resistance.

EXAMPLE 6

In a magnetron sputtering apparatus provided with total three targets, i.e. a Co—Cr alloy (80 wt. % Co—20 wt. % Cr) target, a carbon target and a Si target, a polyimide base film was coated with a Co—Cr layer to a thickness of 0.3 μm, and than successively with a Si layer to a thickness of 5 nm, with a carbon layer to a thickness of 5 nm, a Si layer to a thickness of 5 nm and a carbon layer to a thickness of 5 nm to form a multi-layer protective film of 4 layers to the total thickness of 20 nm. The conditions for forming the layers were an RF power of 1 kw, an argon gas pressure under $5 \times 10^{-3}$ Torr, and a substrate temperature of 100° C., where the layer thickness was adjusted by way of sputtering time. The layers were continuously formed in the same vacuum without breaking the vacuum.

Likewise, Co—Cr film-coated media having a protective film of the same structure as above were prepared with a B target, a Zr target, a Cr target or a W target in place of the Si target without changing the conditions for forming the layers.

Co—Cr film-coated media with or without a monolayer protective film to a thickness of 20 nm, made from targets of carbides of the said elements or a carbon target were prepared as comparative test pieces, where the said carbides included SiC, B4C, ZrC, Cr3C2, WC, etc. and the targets were prepared by sintering their powders.

The strength of the thus prepared test pieces was determined according to a spherical surface sliding method as given below: the Co—Cr film-coated media were blanked out into disks, 5.25" in diameter, and the disks were uniformly coated with a perfluoropolyether-based liquid lubricant, and then pasted each onto glass disks. Mn—Zn ferrite as widely used in magnetic heads was selected as a slider for investigating the sliding strength of the protective films, and the tip end of the slider was polished to a radius of curvature of 5 mm R. Then, the slider was fixed to a support, and the medium-pasted glass disk was turned at a peripheral speed of 2 m/sec and 600 rpm while pressing the tip end of the slider to the medium surface under a load of 20 g. Changes in the tangential force on the slider were recorded, and the sliding strength of the protective films was determined by number of revolutions (passes) until the tangential force started to undergo vibration or a sudden change.

Results of determination of the sliding strength of protective films on the Co—Cr film-coated media are shown in the following Table 3.

TABLE 3

| Sliding strength of various protective films | | | | | | |
|---|---|---|---|---|---|---|
| The invention | | | | | | |
| Protective film (Laminate structure) | — | Si/C | B/C | Cr/C | Zr/C | W/C |
| Sliding strength (1,000 passes) | — | 2,300 | 1,700 | 1,800 | 730 | 1,400 |
| Comparative Example | | | | | | |
| Protective film (Carbide monolayer) | C | SiC | B4C | Cr3C2 | ZrC | WC |
| Sliding strength (1,000 passes) | <430 | 520 | 340 | 120 | 70 | 110 |

As is evident from Table 3, the protective films according to the present invention have a higher sliding strength than that of the protective film composed only of a carbon film or of a monolayer of carbide of Comparative Example.

It was further found that the sliding strength of a protective film could be increased by laminating thin layers of Ti, Ta or V and carbon layers alternately into a multi-layer structure, though not shown in this Example.

EXAMPLE 7

In the same magnetron sputtering apparatus as used in Example 6, three kinds of magnetic recording media with a Co—Cr film coated with a protective film composed of a combination of Si layers and carbon layers, B layers and carbon layers or Cr layers and carbon layers were prepared under the same conditions for preparing the Co—Cr film and the protective films as in Example 6, except that each protective film was a multi-layer protective film composed of 40 layers, each having a thickness of 0.5 nm, with the total thickness being 20 nm. The sliding strength of the protective films on the media was determined in the same manner as in Example 6. It was found that the protective film composed of the Si layers and the carbon layers had a sliding strength of 4,300,000 revolutions (passes), the protective film composed of the B layers and the carbon layers had a sliding strength of 2,700,000 revolutions (passes), and the protective film composed of the Cr layers and the carbon layers had a sliding strength of 3,100,000 revolutions (passes). It can be seen from these results that the sliding strength of the protective film can be increased by making the carbon layers and the Si layers, the B layers or the Cr layer thinner.

EXAMPLE 8

Three kinds of Co—Cr film-coated magnetic recording media having a protective film composed of a combination of Si layers and carbon layers, B layers and carbon layers or Cr layers and carbon layers were prepared under the same conditions as in Example 6. These media were subjected to heat treatment at 350° C. in vacuum in the order of $10^{-7}$ Torr for 30 minutes, and then the sliding strength of the protective films was determined in the same manner as in Example 6. It was found that the protective film composed of the Si layers and the carbon layers had a sliding strength of 3,400,000 revolutions (passes), the protective films composed of the B layers and the carbon layer had a sliding strength of 2,100,000 revolutions (passes), and the protective film composed of the Cr layers and the carbon layers had a sliding strength of 2,400,000 revolutions (passes). It is evident from the foregoing results that the sliding strength of the protective film can be further increased by heat treating the multi-layer protective film in vacuum.

According to the present invention, a protective film for a magnetic recording medium having a distinguished resistance against the sliding can be obtained, because it seems that (1) by distributing a constituent element having a larger atomic size and substantially equal to that of the elements of magnetic film in the region on the interface side of the protective film with the magnetic film, or by making the concentration of boron (B) higher, if the protective layer is composed of boron (B) and carbon (C), both having smaller atomic sizes, in the region on the interface side of the protective film with the magnetic film, the strains and stresses developing due to mismatching of atomic sizes can be lowered to form a good adhesion interface between the protective film and the magnetic film, and (2) by distributing constituent elements having a smaller atomic size in the region on the face side of the protective film, i.e. the side in contact with a magnetic head, the region on the face side can be made denser and the face side can be made smoother to increase the slidability against a magnetic head. The thickness of a protective film is not more than 2,000Å, preferably not more than 300Å in view of the spacing loss of recording and reproduction power. The effects of the present invention can be obtained by increasing the concentration of a constituent element having a smaller atomic size from the interface side of the protective film with a magnetic film toward the face side of the protective film within the said thickness of the protective film.

What is claimed is:

1. A magnetic recording medium which comprises a non-magnetic substrate, a magnetic film formed on the substrate and a protective film having a thickness of 50 to 2,000 Å provided on the magnetic film, the protective film containing at least one selected element selected from the group consisting of B and C as a constituent element, and the concentration of the selected element increasing throughout the protective film from the interface side with the magnetic film toward the opposite face side in a continuous manner.

2. A magnetic recording medium according to claim 1, wherein at least one additional element selected from the group consisting of Ti, Zr, Hf, V, Nb, W, Ta, Al and Si is contained in the protective film beside the at least one selected element selected from the group consisting of B and C.

3. A magnetic recording medium according to claim 1, wherein a difference in the protective film between the concentration of the selected element on the interface side with the magnetic film and that on the face side of the protective film is at least 5%.

4. A recording magnetic medium which comprises a non-magnetic substrate, a magnetic film formed on the substrate and a protective film provided on the magnetic film, the protective film being in a multi-layer structure composed of a plurality of carbon layers and a plurality of metal layers, alternately laid one upon another, the outermost layer of the protective film in contact with the magnetic film being a metal layer composed of at least one element selected from the group consisting of Si, Zr, W, V, B, Cr, Ti and Ta, and the outermost layer on the face side of the protective film being a carbon layer.

5. A recording magnetic medium according to claim 4, wherein said outermost layer on the face side of the protective film has a thickness of 0.5 to 10 nm and said outermost layer of the protective film in contact with the magnetic frilm has a thickness of 0.5 to 30 nm.

6. A recording magnetic medium according to claim 4, wherein said multi-layer structure has been heated in a vacuum to promote interfusion between said carbon layers and said metal layers.

7. A recording magnetic medium according to claim, 6, wherein each of said plurality of metal layers and each of said plurality of carbon layers has a thickness of 0.5 to 2.0 nm.

8. A magnetic recording medium according to claim 9 wherein said protective film has a thickness of 100 to 300 Å.

9. A magnetic recording medium which comprises a non-magnetic substrate, a magnetic film formed on the substrate and a protective film having a thickness of 50 to 2,000Å provided on the magnetic film, the protective film containing at least one selected element selected from the group consisting of B and C as a constituent element and at least one additional element having an atomic size equal to or larger than those of the constituent elements of said magnetic film, and the concentration of the selected element increasing throughout the protective film from the interface side with the magnetic film toward the opposite face side in a continuous manner.

10. A magnetic recording medium according to claim 9, wherein said protective film has a thickness of 100 to 300 Å.

11. A magnetic recording medium according to claim 9, wherein said additional element is at least one member selected from the group consisting of Ti, Zr, Hf, V, Nb, W, Ta, Al and Si.

12. A magnetic recording medium according to claim 9, wherein a difference in the protective film between the concentration of the selected element on the interface side with the magnetic film and that on the face side of the protective film is at least 5%.

13. A magnetic recording medium which comprises a non-magnetic substrate, a magnetic film formed on the substrate and a protective film having a thickness of 50 to 2,000 Å provided on the magnetic film, the protective film being composed of B, C and Si, and a concentration in total of B and C increasing from the interface side of the protective film with the magnetic film toward the opposite face side throughout the protective film in a continuous manner.

14. A magnetic recording medium according to claim 13, wherein a difference in the protective film between the concentration in total of B and C on the interface side with the magnetic film and that on the face side of the protective film is at least 5%.

15. A magnetic recording medium according to claim 13, wherein said protective film has a thickness of 100 to 300 Å.

16. A magnetic recording medium which comprises a non-magnetic substrate, a magnetic film formed on the substrate and a protective film having a thickness of 50 to 2,000 Å provided on the magnetic film, the protective film being composed of B and C, and a concentration of C increasing from the interface side of the protective film toward the opposite face side throughout the protective film in a continuous manner.

17. A magnetic recording medium according to claim 16, wherein a difference in the protective film between the concentration in total of B and C on the interface side with the magnetic film and that on the face of the protective film is at least 5%.

18. A magnetic recording medium according to claim 16, wherein said protective film has a thickness of 100 to 300 Å.

* * * * *